United States Patent
Link et al.

(10) Patent No.: US 9,028,774 B2
(45) Date of Patent: May 12, 2015

(54) PIPETTING APPARATUS AND METHOD FOR PRODUCTION THEREOF

(71) Applicant: Eppendorf AG, Hamburg (DE)

(72) Inventors: Holger Link, Hamburg (DE); Tobias David, Bargteheide (DE)

(73) Assignee: Eppendorf AG, Hamburg (DE)

( * ) Notice: Subject to any disclaimer, the term of this patent is extended or adjusted under 35 U.S.C. 154(b) by 3 days.

(21) Appl. No.: 13/782,791

(22) Filed: Mar. 1, 2013

(65) Prior Publication Data

US 2013/0243666 A1    Sep. 19, 2013

Related U.S. Application Data

(60) Provisional application No. 61/605,781, filed on Mar. 2, 2012.

(30) Foreign Application Priority Data

Mar. 2, 2012    (EP) ...................................... 12001439

(51) Int. Cl.
    *B01L 3/02*     (2006.01)
    *B23P 15/00*     (2006.01)

(52) U.S. Cl.
    CPC .............. *B01L 3/021* (2013.01); *B01L 3/0213* (2013.01); *B01L 2300/14* (2013.01); *B01L 2400/0487* (2013.01); *B01L 2400/049* (2013.01); *B01L 2400/065* (2013.01); *B23P 15/001* (2013.01)

(58) Field of Classification Search
    CPC ................................... B01L 3/02; B01L 3/021
    USPC .................................................... 422/501, 522
    See application file for complete search history.

(56) References Cited

U.S. PATENT DOCUMENTS 3,963,061 A * 6/1976 Kenney ...................... 73/864.14

* cited by examiner

*Primary Examiner* — Paul Hyun
(74) *Attorney, Agent, or Firm* — Arnold & Porter LLP; Todd A. Lorenz

(57) ABSTRACT

The invention relates to a pipetting apparatus, and a method for producing the same, comprising: —a valve arrangement having at least one valve device for setting a pipetting pressure, wherein the valve device comprises a valve chamber; —at least one pump device, which is connected to the valve chamber to generate a chamber pressure in the valve chamber; —a pipetting channel, to which the pipetting container can be connected, and; —a bypass channel, which is open to the surrounding environment; wherein the pipetting channel and the bypass channel are each connected to the valve chamber; —and wherein the at least one valve device is designed such that, to generate the desired pipetting pressure in the pipetting channel, the chamber pressure is distributed in a metered manner by the valve device between the pipetting channel and the bypass channel.

12 Claims, 5 Drawing Sheets

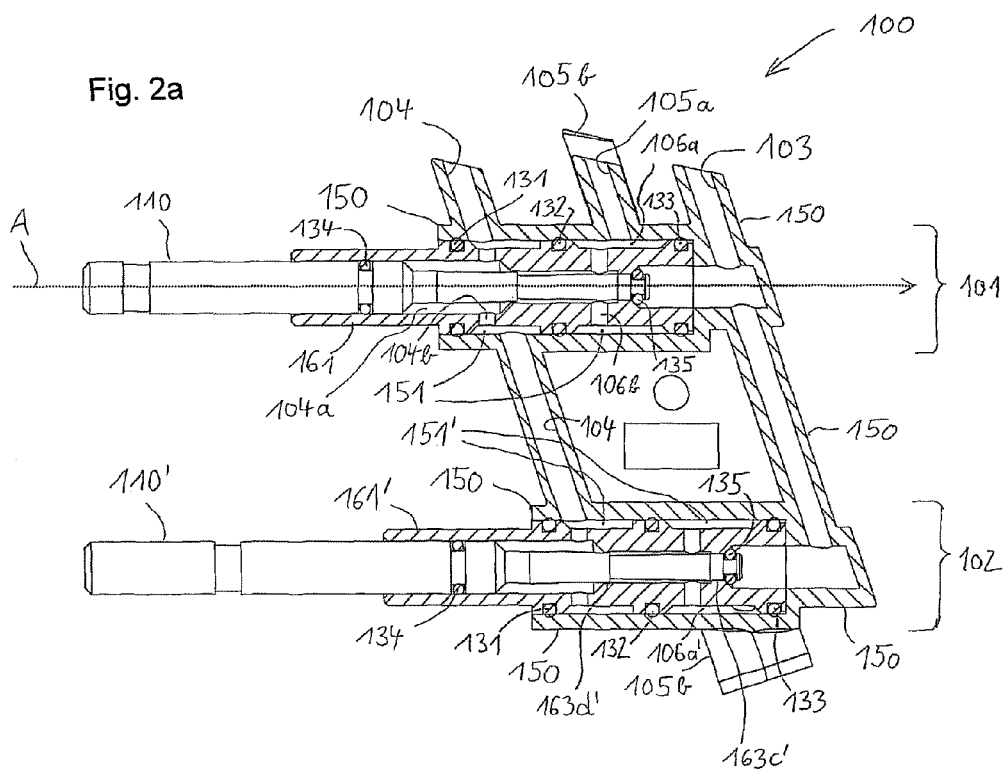
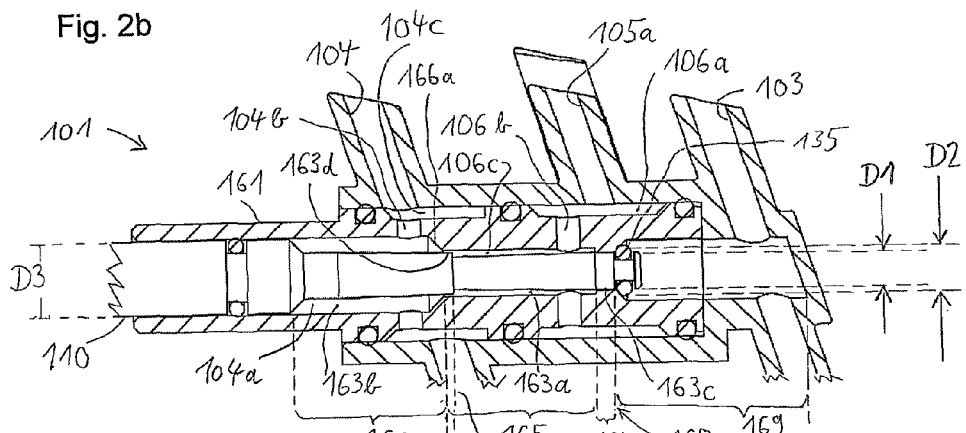
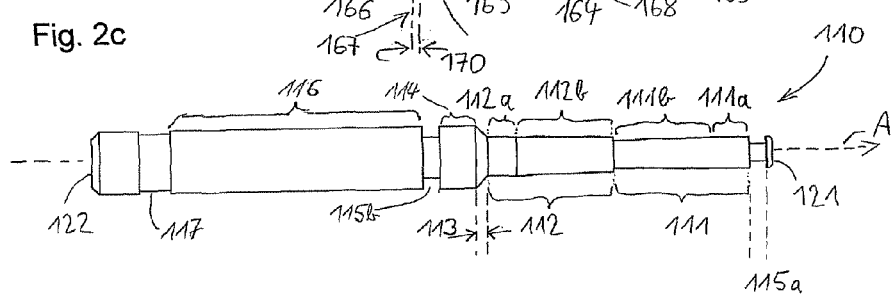

PIPETTING APPARATUS AND METHOD FOR PRODUCTION THEREOF

The invention relates to a pipetting apparatus and to a method for producing this pipetting apparatus.

Such pipetting apparatuses are normally used in medical, biological, biochemical, chemical and other laboratories. In the laboratory, they are used to transport and transfer fluid samples, in particular to meter the samples precisely. With pipetting apparatuses, liquid samples for example are aspirated by means of a vacuum into pipetting containers, for example graduated pipettes, where they are stored and are dispensed therefrom again at the target location.

Pipetting apparatuses include for example hand-held pipetting apparatuses or automatically controlled pipetting apparatuses, in particular computer-controlled pipetting automatons. The apparatuses are generally air cushioned pipetting apparatuses. In this case, an air cushion is provided, of which the pressure is reduced as the sample is received into the pipetting container, whereby the sample is sucked into the pipetting container by means of a vacuum. Such pipetting apparatuses are generally electrically operated apparatuses, which are also referred to as pipetting aids.

Such pipetting apparatuses are generally designed to pipette fluid samples having volumes in the range of, for example, 0.1 ml to 100 ml. Such pipetting apparatuses generally have an electrically driven pump, according to experience a diaphragm pump, which is suitable for pipetting and which can thus generate both a vacuum and an overpressure. The term "pipetting" in this case includes both the taking of a sample by suction by means of a vacuum and also the dispensing of a sample by gravitation and/or expulsion by overpressure. A suction/delivery line is normally used for pipetting, the activity of said line being controllable by the operator by means of suitable valves in the housing body.

An example of a commercially available, hand-held electric pipetting apparatus is the Eppendorf Easypet® by Eppendorf AG, Hamburg, Germany.

For improved metering of the pipetted liquid volume, apparatuses are known that limit the volume flow into the pressure lines and delivery lines, or adapt the power or pressure of the pump accordingly.

U.S. Pat. No. 3,963,061 and U.S. Pat. No. 6,253,628 describe valves that are designed to limit the volume flow in the delivery and suction lines. In this case, the valve needle is provided with a profile that changes the free cross-sectional area in the delivery and suction line depending on the stroke of the valve needle. Precise metering, particularly in pipettes having a small volume, can only be achieved insufficiently with systems of this type. Particularly with throttled pump output, it is clear that the metering is highly dependent on the stroke frequency of the pump. In spite of the throttled volume flow, the pulsations of the pump continue as far as the pipette and therefore cause intermittent metering of the liquid. In this case an accurate volume can only be maintained with difficulty.

Patent DE 103 22 797 describes an arrangement in which, besides the throttle elements, separately throttled openings to the surrounding environment are likewise provided in the delivery and suction line. These openings are connected directly to the delivery and suction line and are designed to limit the maximum overpressure and vacuum of the pump to a defined value. This arrangement is therefore highly restricted with regard to variability. Before the pipetting process is carried out, the user must consider carefully which setting must be made at the throttles for the corresponding fluid volume.

The object of the invention is to provide a pipetting apparatus, which allows accurate pipetting and metering, which in particular is independent of the size of the pipetting container. A further object of the invention is to disclose a method for producing this pipetting apparatus.

This object is achieved in accordance with the invention by the pipetting apparatus according to the claims and by the method according to the claims. Preferred embodiments are disclosed in the dependent claims in particular.

The pipetting apparatus, in particular for pipetting a fluid sample by aspiration into a pipetting container by means of air under a pipetting pressure, comprises the following:
- a valve arrangement having at least one valve device for setting a pipetting pressure, wherein the valve device comprises at least one valve chamber;
- at least one pump device, which is connected to the at least one valve chamber to generate at least one chamber pressure therein;
- a pipetting channel, to which the pipetting container can be connected, and
- a bypass channel, which is open to the surrounding environment;
- wherein the pipetting channel and the bypass channel are each connected to the valve chamber and in particular are connected parallel to one another to the valve chamber;
- here, the at least one valve device is designed such that, to generate the desired pipetting pressure in the pipetting channel, the chamber pressure is distributed by the valve device between the pipetting channel and the bypass channel, and in particular is distributed according to the position of a closure element of the valve device.

The advantage of the invention lies in the fact that accurate metering of the pipetting volume is possible. Due to the created bypass, fluctuations in the pump pressure (vacuum and/or overpressure) when metering continue substantially incompletely as far as the pipetting container connected to the pipetting channel, and in particular do not continue with low pump output. In the case of a pump device formed as a diaphragm pump, the pulsations caused by the diaphragm movement in particular continue substantially incompletely until in the pipetting container. In the optional case of full output of the pump device, even pipetting containers having a small pipetting volume (for example <5 mL) can, in particular, be filled very accurately. The same can be said when dispensing the fluid sample from the pipetting container.

Within the scope of the present invention, the expression "connect two air-filled regions of the valve arrangement" means that the two regions are connected to one another by a connecting channel, so that in particular air can be moved between both regions, and in particular can be moved independently of direction. Such a connection can be indirect or "direct" in particular. Within the scope of the present invention, the expression "direct connection" between two air-filled regions of the valve arrangement means in particular that the two regions are connected by an unbranched connecting channel, wherein it is possible for a variable flow resistance to be provided in this connecting channel, for example a device having a throttle function, in particular a throttle valve. In the case of a direct connection, the two regions can be connected for example via a plurality of lines or chambers, and/or for example along one or more branching points.

A channel, in particular a connecting channel, may be a line, in particular a hose line, or may be another region of the valve arrangement or of the pipetting apparatus designed to guide a flow medium, for example a channel integrated into a cast-shaped part.

Precisely one pump device is preferably provided, which in particular is a diaphragm pump or comprises a diaphragm pump. The pump device preferably comprises a first pump channel on the intake side, which is formed as a suction channel for aspirating the fluid sample into the pipetting container connected to the pipetting channel. The pump device preferably comprises a second pump channel on the output side, said channel being formed as a pressure channel for expelling the fluid sample from the pipetting container connected to the pipetting channel.

The valve arrangement preferably comprises exactly one bypass channel. At least one pump channel connected directly to the pump device is preferably connected directly to the surrounding environment and/or to the bypass channel. With a valve device designed to aspirate the sample, which is to be pipetted, into the pipetting container, the pump channel on the output side is preferably connected directly to the bypass channel and/or to the surrounding environment. With a valve device designed to expel the sample, which is to be pipetted, from the pipetting container, the pump channel on the input side is preferably connected directly to the surrounding environment and/or the bypass channel. In a preferred embodiment of the invention, the pump device is connected to the valve chamber of a first valve device and to the valve chamber of a second valve device.

The pipetting channel is preferably connected to the valve chamber via a first connecting channel having variable flow resistance, and the bypass channel is preferably connected to the valve chamber via a second connecting channel having variable flow resistance, wherein, to generate the desired pipetting pressure in the pipetting channel, the first flow resistance and the second flow resistance are adapted by the valve device, and in particular are adapted simultaneously. Variable flow resistances can be integrated relatively efficiently in terms of construction.

The valve device preferably comprises a closure support element and at least one closure element, which is preferably arranged so as to be arranged movably in translation, preferably movably, and preferably movably in translation and/or rotation, at least between a first position and a second position.

In the first position the closure element preferably closes the first connecting channel and preferably does not close the second connecting channel at the same time.

In the second position the closure element preferably does not close the first connecting channel and preferably simultaneously closes the second connecting channel.

In particular, the first flow resistance and the second flow resistance can be adapted simultaneously by means of the closure element, in particular by means of a single closure element. The pipetting pressure can thus be set in a simple manner.

A closure element is preferably a valve piston, and in this case the closure support element is preferably a piston support element. The valve device is preferably a needle valve device, in which the valve piston is a needle valve piston. The movement of the valve piston can thus be precisely translated into a pressure change in the first and/or second connecting channel, thus enabling the pipetting pressure in the pipetting channel to be accurately set.

The closure element is preferably mounted in a sprung manner by means of a spring device, which presses the closure element into the first position and which is tensioned by moving the closure element from the first position into the second position.

The closure element is preferably formed such that it partially opens the first connecting channel and the second connecting channel when it is arranged in at least one third position between the first and the second position. The first connecting channel and the second connecting channel are preferably each partially opened over at least half the distance between the first and second position. As a result of this third position, the pump device can be connected not only to the pipetting channel, but simultaneously also to the bypass channel open to the surrounding environment. Fluctuations in the chamber pressure are thus transferred at least not completely to the pipetting channel, but are damped. Accurate pipetting is thus possible.

The closure element is preferably formed such that it closes the first connecting channel further in a third position than in a fourth position, and preferably closes the second connecting channel further in the fourth position than in the third position. In this case, the third position and fourth position are arranged in particular between the first position and second position. As a result of this measure, the distribution of the pressure drop from the chamber pressure over the pipetting channel and over the bypass channel can be adapted selectively according to the position of the closure element. The third position is preferably arranged closer to the first position, and the second position is preferably arranged closer to the fourth position.

The at least one valve device preferably comprises a valve chamber, wherein the closure element is a valve piston, which extends along an axis A through the valve device and is movable in translation along the axis A relative to the main body, at least between a first position and a second position. The valve chamber is preferably arranged at least in part in the piston support element.

The pipetting apparatus is preferably manually operable, wherein the valve device is designed for the position of the closure element to be determined by the user in order to set the desired pipetting pressure in the pipetting line. The movement of the closure element is preferably driven by the user. It is also possible however for the movement of the closure element to be electrically driven and in particular to be controlled by an electric control device (preferably provided) of the pipetting apparatus.

The first connecting channel preferably has a first opening cross section, and the valve piston preferably has a first piston portion, which is arranged movably in the first opening cross section so as to close said first opening cross section, at least in part or completely, between the first and second position, in particular according to the position of the valve piston having a different first opening cross section. The second connecting channel preferably has a second opening cross section, and the valve piston preferably has a second piston portion, which is arranged movably in the second opening cross section so as to close said second opening cross section, at least in part or completely, between the second and first position, in particular according to the position of the valve piston having a different second opening cross section. The first piston portion and the second piston portion may each be a throttle portion or may comprise such a throttle portion, which in particular may be conical. A variable flow resistance can thus be implemented in a simple manner in the first connecting channel and/or in the second connecting channel.

The first piston portion and/or the second piston portion preferably has a conical portion, of which the cross section perpendicular to the axis A changes, at least over portions, continuously and/or partially in increments along the axis. Due to the conical formation of the first and/or of the second piston portion, the pipetting pressure can, in particular, be set in a gentle and comfortable manner.

In a first preferred embodiment of the invention, the pump device is connected to the valve chamber of a first valve device and to the valve chamber of a second valve device. A first pump channel of the pump device is preferably connected to the first valve device, and a second channel of the pump device is preferably connected to the second valve device. In this case, the pump device preferably comprises a pump, in particular a diaphragm pump, preferably a single pump. In accordance with the first preferred embodiment of the invention, the pipetting apparatus preferably comprises at least one, preferably exactly one, first valve device having a first valve chamber and one, preferably exactly one, second valve device having a second valve chamber, wherein the at least one, preferably exactly one, pump device is connected to the first valve chamber to generate a first chamber pressure in said first valve chamber, and is connected to the second valve chamber to generate a second chamber pressure in said second valve chamber, wherein the first valve chamber and the second valve chamber are each connected to the at least one, preferably exactly one, pipetting channel and to the at least one, preferably exactly one, bypass channel. The first valve device is preferably designed such that a pressure is set in the pipetting channel and is suitable for aspirating a fluid sample into a pipetting container connected in an airtight manner to the pipetting channel. The second valve device is preferably designed such that a pressure is set in the pipetting channel and is suitable for dispensing a fluid sample from a pipetting container connected in an airtight manner to the pipetting channel.

The pipetting apparatus is preferably also manually operable and is designed such that, to aspirate the fluid sample, the connecting channel between the first valve chamber and the pipetting channel is at least partially opened and the connecting channel between the second valve chamber and the pipetting channel is closed, and such that, preferably to dispense the fluid sample, the connecting channel between the first valve chamber and the pipetting channel is closed and the connecting channel between the second valve chamber and the pipetting channel is at least partially opened.

The pipetting apparatus is preferably also manually operable and is designed such that, to aspirate the fluid sample, the connecting channel between the first valve chamber and the bypass channel is at least partially opened or is closed, and the connecting channel between the second valve chamber and the bypass channel is open, and such that, preferably to dispense the fluid sample, the connecting channel between the first valve chamber and the bypass channel is open and the connecting channel between the second valve chamber and the bypass channel is at least partially or completely opened.

The pipetting apparatus is also preferably designed such that substantially only the air volume corresponding to the air volume that is required to set the desired pipetting pressure in the pipetting channel is exchanged with the surrounding environment through the bypass channel, wherein air is exchanged preferably substantially only when setting the pipetting pressure and substantially no air is preferably exchanged when the desired pipetting pressure has been reached. The air volume exchanged between the valve arrangement is preferably the net volume flow of air during the aspiration procedure or during the expulsion procedure. This embodiment provides the advantage that the air circulates substantially cyclically in the valve arrangement and the air is substantially only exchanged with the surrounding environment to the extent necessary to change the pipetting pressure. On the one hand, harmful, for example moist, ambient air is thus prevented from being drawn unnecessarily into the valve arrangement. On the other hand, the air from the valve arrangement is not unnecessarily released into the environment, which is more comfortable for the user.

The pipetting apparatus preferably has exactly one pump device and at least one first pump channel for the aspirated air, which is connected on the intake side to the pump device, and a second pump channel for the dispensed air, which is connected on the delivery side to the pump device, wherein the first pump channel is preferably connected to the first valve chamber and the second pump channel is preferably connected to the second valve chamber, such that both the suction pressure in the first valve chamber and the dispensing pressure in the second valve chamber can be produced by means of the one pump device. Such an arrangement can be produced particularly cost-effectively.

In a second preferred embodiment of the invention, the valve arrangement comprises exactly one valve device. In particular in this case, the pump device is preferably designed to reverse the pumping direction so that each of the two pump channels of the pump device can act both as a suction channel (input channel) and as a delivery channel (output channel).

The pipetting apparatus is preferably designed as a manually operable electric pipetting apparatus, which in particular comprises a pistol-like grip, which comprises at least one actuation element, which can be engaged by the user, the chamber pressure being controlled by the user and distributed, metered by the at least one valve device, between the pipetting channel and the bypass channel upon actuation of said actuation element to generate the desired pipetting pressure in the pipetting channel.

The pipetting apparatus preferably has a device for automatically setting the pump output of the at least one pump device according to the position of the closure element of the valve device relative to the main body of the valve device. The pipetting apparatus preferably comprises a device for automatically setting the pump output of the at least one pump device according to the position of the actuation element relative to the main body of the valve device. This device may be a position sensor for detecting the position of the closure element, in particular of the valve piston, and/or of the actuation element. The position sensor may be a Hall sensor. Alternatively, optical position recognition would also be possible.

The method according to the invention for producing the pipetting apparatus according to the invention preferably comprises the following steps:
 manufacturing the at least one valve device of the valve arrangement at least partially from a first material, which in particular may be a ceramic or a metal; preferably: manufacturing at least one valve piston, in particular from metal;
 manufacturing the at least one pipetting channel and in particular also the at least one bypass channel at least partially from a second material;
 preferably: at least partially manufacturing the at least one pipetting channel, and in particular also at least partially manufacturing the at least one bypass channel, in particular manufacturing in one piece, in particular with use of a casting method, wherein the second material in particular is plastic or a metal, in particular aluminium.

At least one support component, which in particular is manufactured in one piece and preferably comprises at least part of the pipetting channel, preferably at least part of the bypass channel, and preferably comprises at least part of the valve chamber of at least one valve device, preferably of exactly two valve devices, is preferably provided in the valve arrangement. This support component preferably comprises at least one receiving region for receiving a piston support element, in particular exactly two such receiving regions.

A pipetting container is, in particular, a hollow cylindrical container, which comprises a first opening for receiving/dispensing the fluid sample and at least one second opening for applying the pipetting pressure. The pipetting container preferably comprises a connecting portion, by means of which it is detachably connectable, in particular in an airtight and pressure-tight manner, to the corresponding connecting portion (preferably provided) of the pipetting apparatus. A pipetting container is preferably a commercially obtainable graduated pipette or volumetric pipette. The possible pipetting container sizes, that is to say the maximum holding capacities, of a pipetting container may in particular be between 0.1 ml and 100 ml. The fluid sample is generally a liquid, in particular a predominantly aqueous sample, for example a physiological aqueous solution.

Further preferred embodiments and features of the pipetting apparatus according to the invention and of the method according to the invention for production thereof will emerge from the following description of the exemplary embodiments in conjunction with the figures and the description thereof. Like components in the exemplary embodiments are denoted substantially by like reference signs, unless otherwise stated or otherwise obvious from the context. In the drawings:

FIG. 2a shows a cross-sectional view through a valve arrangement of the pipetting apparatus in FIG. 1, in accordance with a first preferred embodiment of the invention, in a first state.

FIG. 2b shows a detail from FIG. 2a.

FIG. 2c shows a cross-sectional view through a valve piston of the valve arrangements in FIGS. 2a, 2d to 2g and 3a to 3c.

Figure 1:
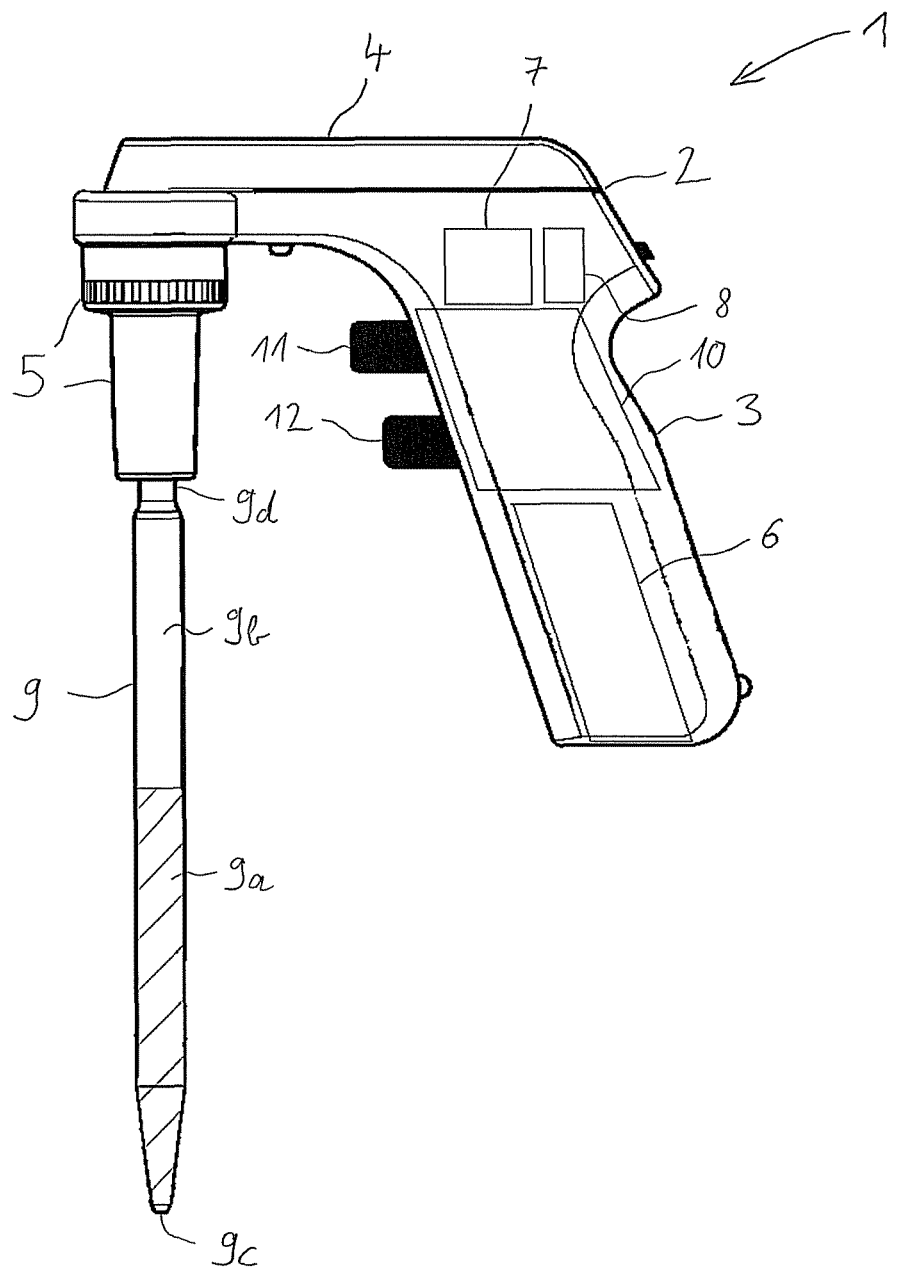
FIG. 1 shows a schematic side view of a first exemplary embodiment of the pipetting apparatus according to the invention.

FIG. 1 shows an exemplary embodiment of a pipetting apparatus 1 according to the invention. This pipetting apparatus 1 is used as an electrically operated, manual pipetting aid for use with volumetric pipettes or graduated pipettes 9 made of glass or plastic, which can be obtained in various sizes with filling volumes between 0.1 mL (milliliters) and 100 mL via laboratory equipment suppliers.

The expressions "above" and "below" will be used in particular to describe the invention. These relate to an arrangement of the pipetting apparatus in space, in which a pipetting container that extends along a longitudinal axis and is connected to the pipetting apparatus is arranged parallel to the direction of gravity, that is to say vertically. The directional indication "downwards" denotes the direction of gravity, whilst the indication "upwards" denotes the opposite direction.

The pipetting apparatus 1 is an air cushion pipetting apparatus, which is used in particular to pipette a fluid sample by aspiration into a pipetting container by means of air under a first pipetting pressure, and/or to dispense or expel a fluid sample from a pipetting container by means of air under a second pipetting pressure. The air cushion pipetting apparatus uses air as a working medium so as to transport the fluid sample into the pipetting container and therefrom. This will be explained in greater detail hereinafter:

In FIG. 1 the fluid sample 9a in the pipetting container 9 is shown in a hatched manner. Air, which is expanded compared to the ambient pressure, that is to say is under vacuum, is located above the hatched region in the region 9b of the pipetting container. The vacuum is the pipetting pressure applied via the pipetting channel of the pipetting apparatus to aspirate the sample and in FIG. 1 holds the sample 9a at a constant height in the container against the force of gravity. The first pipetting pressure for aspirating the sample is selected in particular such that it is at least less than the ambient pressure to which the sample to be pipetted is exposed. The first pipetting pressure for aspirating the sample is selected in particular such that it applies the counterforce required to raise or to hold the liquid column 9a in the pipetting container 9, said counterforce in particular being substantially at least as large as the weight of the liquid column 9a. The second pipetting pressure for dispensing the fluid sample 9a from the pipetting container 9 has to be at least smaller than the first pipetting pressure, in particular at least so small that the liquid column overcomes the counterforce caused by the pipetting pressure (vacuum) and is dispensed under the effect of gravity. The second pipetting pressure is in particular at least greater than the ambient pressure in order to expel the fluid sample from the pipetting container.

As a main body 2, the pipetting apparatus 1 comprises a housing 2, which comprises an arm portion 4, at the end of which a connecting portion 5 of the pipetting apparatus is provided on the underside, with which the pipetting container 9 is connected detachably and in an airtight manner to the connecting portion 5. In this case, the connecting portion is designed as an exchangeable receiving cone 5 that can be screwed. It contains a clamping portion (not visible) for holding, with a force fit, the pipetting container 9 insertable into the clamping portion and a membrane filter (not visible), which is inserted into the pipetting channel between the arm portion 4 and the pipetting container 9. The membrane filter prevents the fluid sample to be pipetted from infiltrating the pipetting apparatus or the valve device thereof. The functionality of the pipetting apparatus is thus ensured.

The main body 2 further comprises a pistol-like grip portion 3. A battery unit or accumulator unit 6 is arranged inside this grip portion 3 in an accumulator compartment that is open, or can be opened, downwardly. The accumulator unit 6 may comprise a nickel/metal hydride accumulator or a lithium polymer accumulator or a lithium-ion/polymer accumulator for example, which can provide an operating voltage of 9 V for example. The accumulator unit 6 can be removed downwardly from the main body 2 in the manner of a pistol magazine and is preferably held on the main body by a latching device (not shown). A pump device 7 operated electrically by the operating voltage of the accumulator unit is additionally housed inside the grip portion 3 and comprises an electrically operated diaphragm pump having an adjustable pump output. An electric control device 8 inside the housing 2 comprises electric circuits, in particular programmable electric circuits. The control device 8 is designed to control at least one function of the electrically operated pipetting apparatus 1.

Figure 2D:
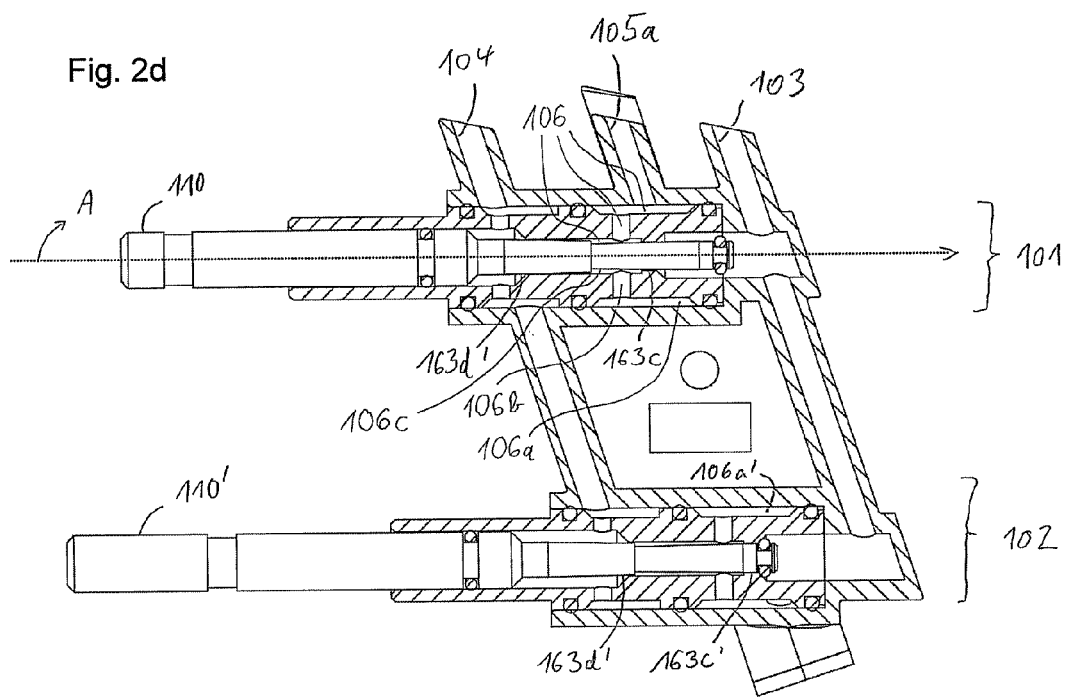
FIG. 2d shows the valve arrangement of FIG. 2a in a second state.
Figure 2E:
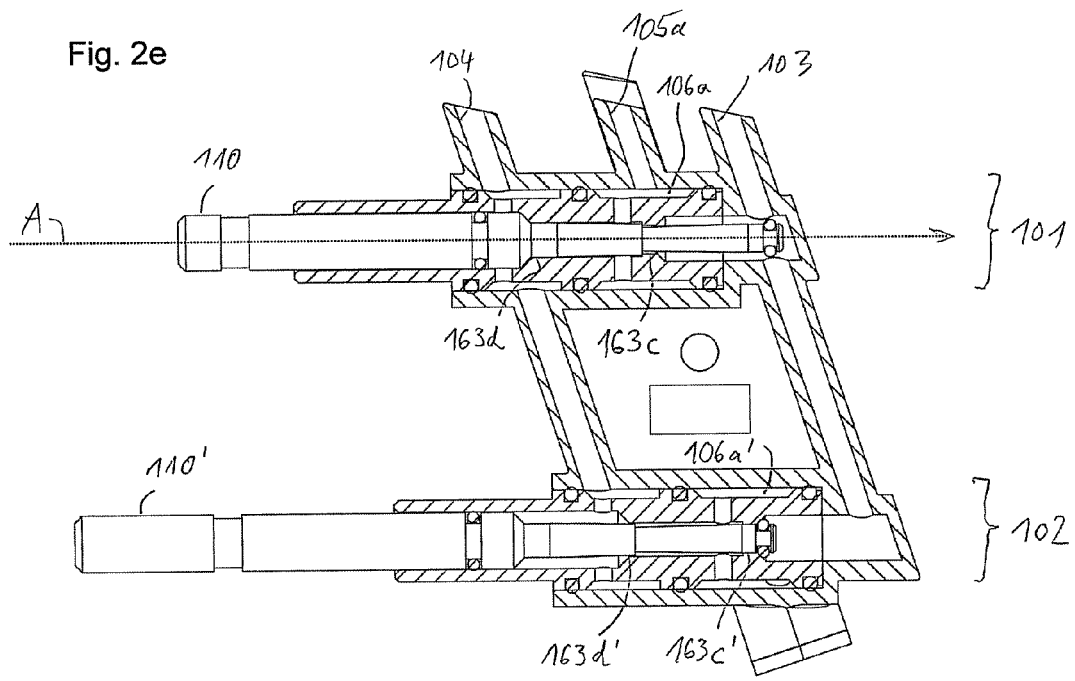
FIG. 2e shows the valve arrangement of FIG. 2a in a third state.
Figure 2F:
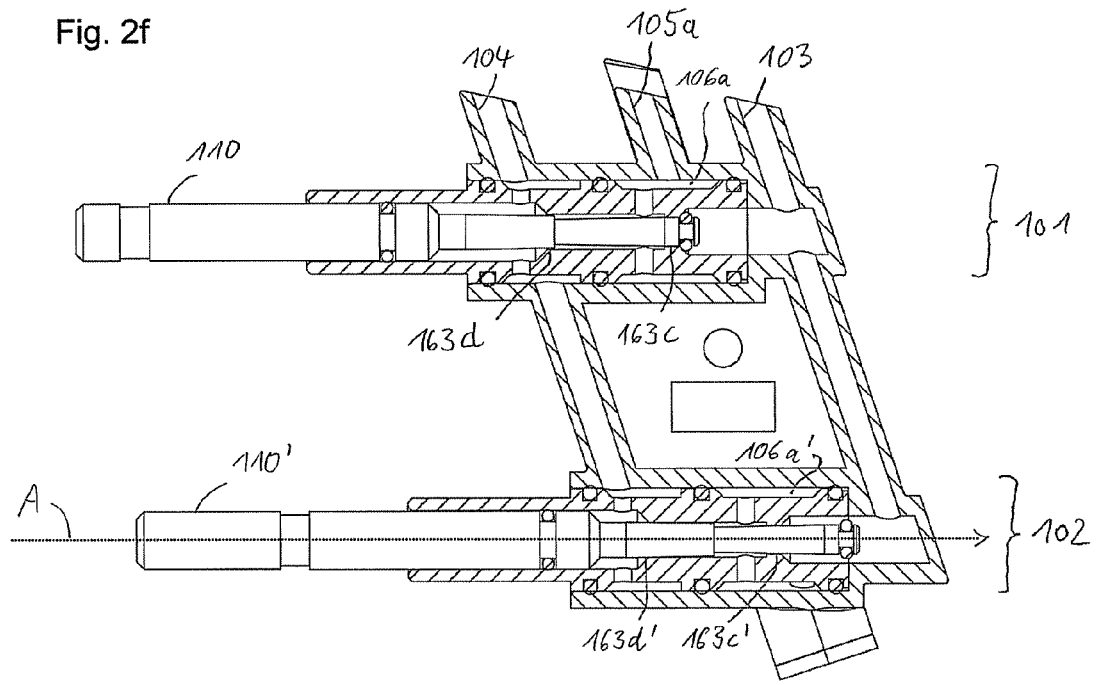
FIG. 2f shows the valve arrangement of FIG. 2a in a fourth state.
Figure 2G:
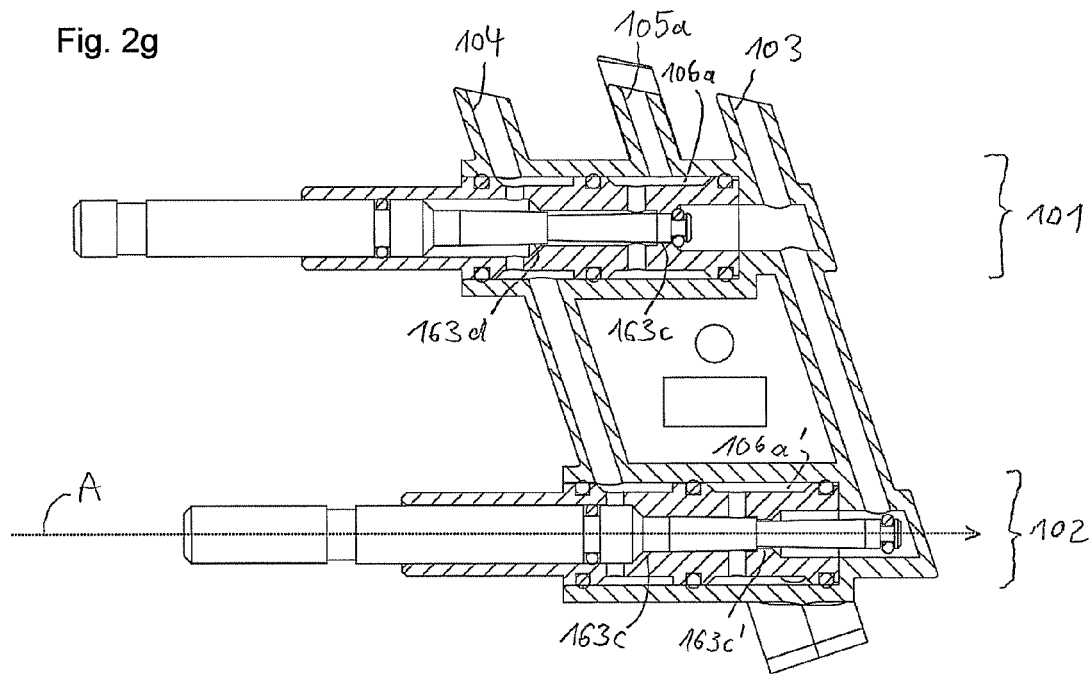
FIG. 2g shows the valve arrangement of FIG. 2a in a fifth state.
Figure 3A:
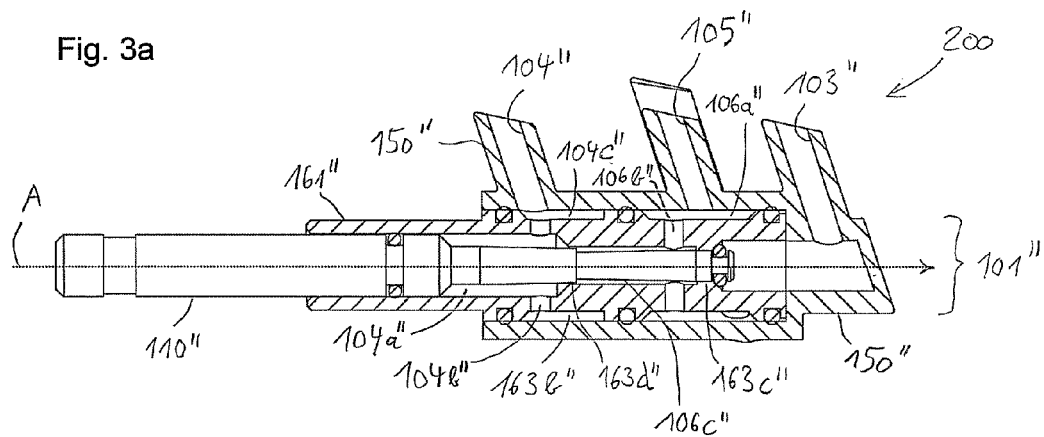
FIG. 3a shows a cross-sectional view through a valve arrangement of a pipetting apparatus according to the invention, in accordance with a second preferred embodiment of the invention, in a first state.
Figure 3B:
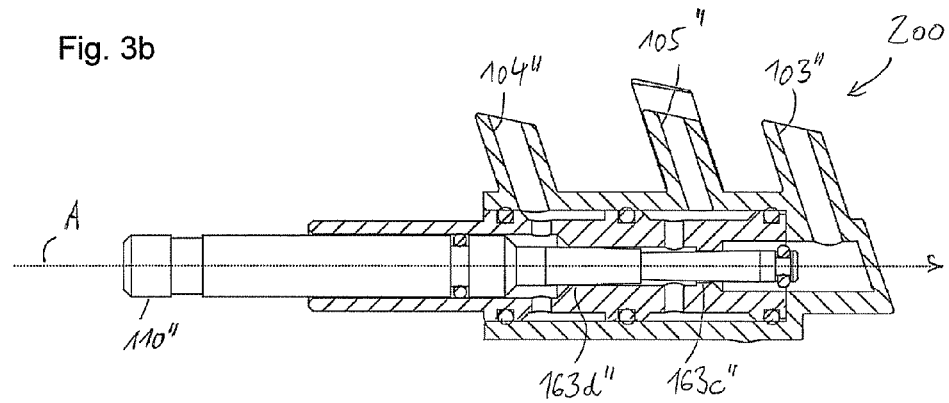
FIG. 3b shows the valve arrangement of FIG. 3a in a second state.
Figure 3C:
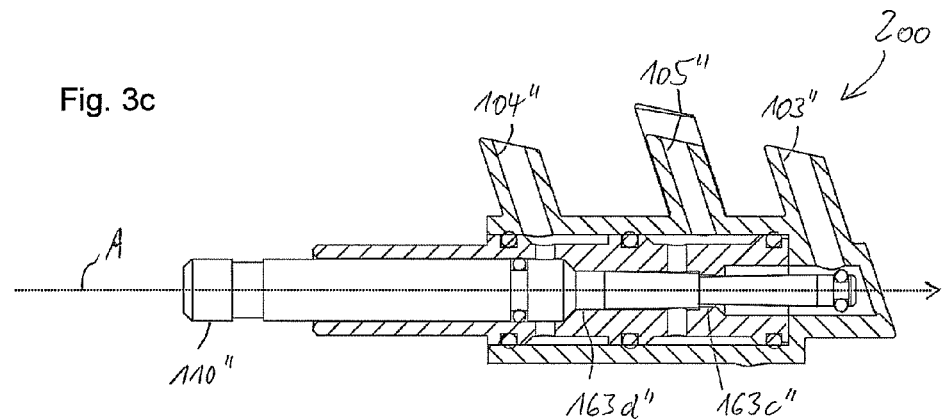
FIG. 3c shows the valve arrangement of FIG. 3a in a third state.

The valve arrangement 10 having at least one valve device is also arranged inside the grip portion 3 and can be designed in particular in accordance with FIGS. 2a to 2g or in accordance with FIGS. 3a to 3c.

The pipetting apparatus 1 comprises two actuation elements 11, 12 for manually actuating the valve devices of the valve arrangement 10. The actuation elements are designed as spring-mounted push-buttons, of which the springs are tensioned when the push-button is moved by a user's finger from its starting position into the pressed-in position. The push-buttons 11, 12 are movable independently of one another. The two actuation elements 11, 12 are arranged captively on the main body 2, in parallel one above the other and movably in a horizontal direction. Each actuation element is preferably fixed substantially rigidly to a valve piston 110, 110' of a valve device of the valve arrangement 10, 100, at least in one direction along the axis A, in particular in the valve arrangement 100 according to the first preferred embodiment of the invention, in particular by mounting the actuation button on the sub-portion 117 and end portion 122 of the valve piston 110.

The pipetting apparatus preferably comprises a blocking device, which automatically blocks, in particular locks, one actuation element when the other actuation element is actuated. The blocking device may comprise a catch element, which is mechanically displaced by actuating one actuation element so as to block the movability of the other actuation element in a blocked state. The blocking device may also be designed however to set the blocking state electrically.

The first actuation element 11 is used to aspirate the fluid sample into the pipetting container. The second actuation element 12 is used to dispense or expel the fluid sample from the pipetting container.

FIG. 2a shows a cross-sectional view through a valve arrangement 100 of the pipetting apparatus in FIG. 1, in accordance with a first preferred embodiment of the invention, in a first state. In this first state, the connecting channel between the first valve device 101 and the pipetting channel 103 is closed by the valve piston 110, 110', so that the pressure in the pipetting channel 103 cannot be changed by the pump device. This is also made impossible in the exemplary embodiment since the pump device is only activated here by actuating an actuation element. In the first state of the valve arrangement 100, a liquid column 9a in particular can be held at constant height with a suitable pipetting pressure (vacuum) in the pipetting channel.

The valve arrangement 100 is produced in the exemplary embodiment from different components, which in particular are fitted together. These components in particular comprise a support component 150, two piston support elements 151, 151', two valve pistons 110, 110' and sixteen ring seals 131, 132, 133, 134, 135. The support component 150 integrally comprises a first, substantially hollow-cylindrical receiving portion 151 and a second, substantially hollow-cylindrical receiving portion 151'. Each receiving portion is open outwardly on one side so as to enable the insertion of a first piston support element 161 or second piston support element 161'. A piston support element 161, 161' preferably has a small clearance fit relative to its respective receiving portion 151, 151', so that each piston support element 161, 161' is fixed with a force fit in the respective receiving portion 151, 151' by pressing together the ring seals, in this case the three ring seals 131, 132, 133, which are each arranged between a piston support element 161, 161' and its receiving portion 151, 151' and are each held on the respective piston support element in a corresponding O-ring holder of the piston support element 161, 161'. The O-ring holder is formed in the present case as a recess in the piston support element. The ring seals are formed tightly, such that they produce an airtight and (vacuum) pressure-tight seal when the pipetting apparatus is used as intended.

The first valve piston 110 is arranged in part in the first piston support element 161, and the second valve piston 110' is arranged in part in the second piston support element 161'. A valve piston 110, 110' is in each case rotationally symmetrical about an axis A and is arranged so as to be movable horizontally in translation along this axis relative to its piston support element 161, 161', in particular between the first position and the second position of the valve piston relative to its piston support element 161, 161', wherein the first connecting channel is closed in the first position and the second connecting channel is opened, in particular completely, that is to say in particular is opened to the maximum, and wherein the second connecting channel is closed in the second position and the first connecting channel is opened, in particular completely, that is to say in particular is opened to the maximum.

The valve piston 110, 110' acting as a closure element is preferably spring-mounted by means of a spring device on the support component 150 or on the main body 2 of the pipetting apparatus, wherein the spring device presses each of the valve pistons 110, 110' into the first position and is tensioned by moving the closure element from the first position into the second position.

The valve arrangement 100 can be produced particularly easily and cost-effectively, and therefore efficiently, because the aforementioned components can be assembled easily by being fitted together, in particular without the use of special tools and/or complicated fixing steps during the assembly process.

In the exemplary embodiment the key components of the first valve device 101 and of the second valve device 102 of the pipetting apparatus according to the invention are formed by the components 150, 151, 151', 110, 110', 131, 132, 133, 134, and 135 of the valve arrangement 100:

FIG. 2a also shows: A valve device 101, 102 used in each case to set a pipetting pressure in the pipetting channel 103. The design and function of the first valve device 101, which is used to aspirate air from the pipetting channel and therefore to aspirate the liquid sample into the pipetting container connected in series to the pipetting channel, will be explained hereinafter. The design of the second valve device 102, which is used to dispense/expel air from the pipetting channel and therefore to dispense/expel the liquid sample from the pipetting container connected in series to the pipetting channel, is substantially similar to the design of the first valve device 101. Like reference signs are used to denote corresponding components of the first and second valve devices, although said reference signs are provided with an apostrophe in the case of the second valve device 102. Repetitions in the description can thus be avoided.

As can be seen in particular in the enlarged detail of FIG. 2a shown in FIG. 2b, the valve device 101 comprises a first valve chamber 106, which in particular is used as a low-pressure chamber. The first valve chamber 106 is formed in particular by a substantially cylindrical recess 106a in the outer wall of the substantially hollow-cylindrical piston support element 161, two bores 106b in the piston support element 161, and a portion 106c of the interior region 163 of the piston support element 161, more specifically substantially by the sub-portion 163a thereof (see also FIG. 2d). The bores 106b each connect the cavity of the recess 106a to a hollow interior region 163 of the piston support element 161.

The valve piston 110, which varies the extension of the interior region 163 depending on the position of the valve piston 110 with respect to the piston support element 161, extends through the interior region 163 of the piston support element 161. The interior region 163 is substantially rotationally symmetrical about the axis A. Highly precise manufacture can be achieved in particular by the rotationally symmetrical design of the valve piston and interior region of the piston support element. The flow-induced development of noise is also thus relatively low.

The interior region 163 comprises the portions 163a, 163b, 163c and 163d. The first sub-portion 163a is formed in the substantially hollow-cylindrical sub-portion 165 of the piston support element 161 in direct connection with the bores 106b. The second sub-portion 163b is in direct connection with the bores 106b in the substantially hollow-cylindrical (at least over portions) sub-portion 166 of the piston support element 161. The sub-portion 166 comprises a hollow conical stop region 166a, against which a conical sub-portion shaped in a complementary manner of the valve piston may strike and rest in an airtight and pressure-tight manner. The second sub-portion 163b in the region of the sub-portion 166 of the piston support element 161 is assigned in the first state of the valve arrangement 100 and in the first position of the valve piston 110 to the interior region 163. As the second connecting channel of the valve chamber 106 is closed increasingly towards the bypass channel 104, the second sub-portion 163b reduces increasingly however and ultimately disappears completely when the second connecting channel is closed; however, the first connecting channel opens substantially simultaneously, so that the contiguous interior region 163 is expanded by a sub-portion 163c in the substantially hollow-cylindrical sub-portion 164 of the piston support element 161 and by a sub-portion 163d in the substantially hollow-cylindrical sub-portion 169 of the piston support element 161, which adjoins the sub-portion 163c, which likewise enlarges increasingly.

In particular, a connecting channel is understood to mean a channel portion of the valve device that forms the main flow resistance when air flows between two pressure regions having different pressures. In principle, the channel system, for example comprising the first connecting channel and further channel portions of the valve device connecting thereto in series, specifically forms a total resistance for the flowing air. The contribution of the further channel portions connected in series to the total resistance is relatively small however. This is used to produce a variable flow resistance, in particular with a small spatial requirement, by changing the first (or second) opening cross section in the region of the first (or second) connecting channel.

The first connecting channel between the valve chamber 106 and the pipetting channel is formed in particular by the substantially tubular gap, which has already been denoted as the sub-portion 103c of the interior region 163 of the piston support element 161. The sub-portion 163c is formed by the cavity perpendicular to the axis A between the valve piston 110, in particular between the first throttle portion 111 thereof and the substantially hollow-cylindrical sub-portion 164 of the piston support element 161. The greatest constriction and therefore the greatest proportion of the flow resistance of the first connecting channel is formed in the first opening cross section 168 along the line 168, which is shown in FIG. 2b. In particular in FIGS. 2a, 2b, 2f and 2g, the first connecting channel is fully closed, since in each of those figures the ring seal 135 of the valve piston 163 strikes against the hollow conical stop region 169a of the sub-portion 169 of the piston support element 161, where it rests in an airtight and pressure-tight manner. The sub-portion 163c of the interior region 163 of the piston support element 161 is preferably denoted as the first connecting channel 163c.

The first connecting channel 163c is variable and thus substantially forms the first variable flow resistance. It opens increasingly as the second connecting channel 163d is closed increasingly when the valve piston 110 is pressed increasingly by the user into the piston support element 161. Accordingly, it closes increasingly as the second connecting channel 163d is increasingly opened when the valve piston 110 is pressed increasingly from the piston support element 161 as a result of diminishing pressure applied by the user's finger and as a result of the restoring force of the spring.

In the first state of the valve arrangement in FIG. 2a, the pump device is preferably inactive, so that preferably no air flows between the bypass channel 104 and the valve chamber 106, in particular in the second connecting channel, and no pressure falls occur over the second connecting channel. It would be possible however for the pump device to also be active in the first state, in which case it then pumps the air in particular so as to circulate through the channel regions of the valve arrangement 100, in particular substantially without a net volume exchange of air with the surrounding environment via the open bypass channel.

In the second state of the valve arrangement in FIG. 2d and in the third state of the valve arrangement in FIG. 2e, the pump device is active. A vacuum compared to the ambient pressure, which for example is present in the bypass line 104 open to the surrounding environment, is then produced, or then exists, in the pump channel 105a acting as a suction line 105a. In the case of the activity of the second valve device 102, an overpressure compared to the ambient pressure in the pump channel 105b, which acts as a pressure line 105b and is connected to the valve chamber portion 106a', is produced, or exists. This vacuum (or overpressure) is in each case present in the valve chamber 106 substantially as a chamber pressure. There is then a pressure drop between the bypass channel 104 and the valve chamber 106, said pressure drop being formed by the total resistance of the channel portions, connected in series, between the pump input (or the pump output in the case of the second valve device 102) and the surrounding environment, wherein the total resistance is formed substantially however by the sub-portion 163d of the interior region 163.

The sub-portion 163d is a substantially tubular gap, which forms in the substantially hollow-cylindrical sub-portion 170 of the piston support element 161. The sub-portion 163d of the interior region 163 of the piston support element 161 is defined as the cavity, which is formed perpendicularly to the axis A between the valve piston 110, in particular between the second throttle portion 112 thereof and the substantially hollow-cylindrical sub-portion 165 of the piston support element 161. The sub-portion 163d of the interior region 163 of the piston support element 161 is preferably denoted as the second connecting channel 163d.

The second connecting channel 163d is variable and thus substantially forms the second variable flow resistance. The second connecting channel closes increasingly as the first connecting channel 163c is increasingly opened when the valve piston 110 is pressed increasingly into the piston support element 161. The greatest constriction and therefore the greatest proportion of the flow resistance of the second connecting channel forms in the second opening cross section 168 along the line 167, which is shown in FIG. 2b.

The bypass channel 104 in particular also substantially contains the tubular recess 104c in the outer wall of the piston support element 161, which is arranged as a cavity between the piston support element 161 and the receiving region 151 of the support component 150, and which is sealed laterally along the axis A by the two ring seals 131 and 132. The bypass channel 104 in particular also substantially contains the tubular cavity 104a and the two bores 104b, which connect the cavity 104c to the cavity 104a.

In the first state of the valve arrangement in FIG. 2a, the second connecting channel 163d is fully opened and the first connecting channel 163c is fully closed, so that the chamber pressure of the valve chamber 106 deviates minimally from the ambient pressure in the bypass channel 104. The valve piston 110 is located in the first position relative to the piston support element 161.

In the second state of the valve arrangement in FIG. 2d, the second connecting channel 163d demonstrates a flow resistance, which dominates the total resistance for the air flowing between the bypass channel 104 and the valve chamber 106 and which increases as the second connecting channel is increasingly closed. In the third state of the valve arrangement in FIG. 2e, the second connecting channel 163d is completely closed. In the second state of the valve arrangement in FIG. 2d, the first connecting channel 163c also demonstrates a flow resistance, which dominates the total resistance for the air flowing between the pipetting channel 103 and the valve chamber 106 and which reduces as the first connecting channel is increasingly opened. In this second state of the valve arrangement 100, the valve piston 110 is located in a third position, which is arranged between the first position and the second position.

The further the valve piston 110 is moved into the first position, the greater is the proportion of air that is drawn through the bypass channel 104. The proportion of air that is sucked through the pipetting channel is thus lower accordingly. As a result, the lifting speed (volume per time) of the fluid sample into the pipetting container connected to the pipetting channel and the maximum liquid column in the pipetting container are low due to the gravity acting on the liquid column. Accordingly, the further the valve piston 110 is moved into the second position, the lower is the proportion of air that is drawn through the bypass channel 104. The proportion of air that is sucked through the pipetting channel is thus larger accordingly. If the valve piston 110 is moved maximally into the piston support element 161 (second position), substantially no more air is thus drawn via the bypass line 104. The volume of air aspirated from the pipetting channel 103 thus reaches a maximum value. As a result, the lifting speed and the liquid column in the pipetting container are each at a maximum. Additionally to the control of the lifting speed via the bypass channel 104, the change in cross section, in particular the conical form of at least one sub-portion (111, 112) of the valve piston 110, regulates the air speed over the path of the airflow from the inlet 106b in the interior region 163 of the piston support element 161 to the pipetting channel 103. This function of the valve arrangement is yet to be described hereinafter in particular. The lifting speed of the liquid column into the pipetting container can thus be metered more finely.

If, starting from the second state of the valve arrangement 100 in FIG. 2d, the valve piston 110 is transferred by the user from the third position back into the first position so as to terminate the aspiration process, the pump output is preferably regulated in a predetermined manner by the electric control device so as to set the pump power according to the first flow resistance in the first connecting channel, such that the pipetting pressure remains constant until the first position of the valve piston is reached again. The volume of the liquid column aspirated by the user thus remains constant in the pipetting container. In particular, it is possible that, when the piston is moved from the third position into the first position, the pump output present in the third position is at least kept constant until the first position has been reached.

In the third state of the valve arrangement in FIG. 2e, the first connecting channel 163c is fully opened and the second connecting channel 163d is fully closed, so that the chamber pressure in the valve chamber 106 is applied maximally to the pipetting channel 103. The valve piston 110 is located in the second position relative to the piston support element 161.

Furthermore, the second connecting channel 163d' of the second valve device 102 is completely opened in the first, second and third state of the valve arrangement in FIGS. 2a, 2d and 2e, and the first connecting channel 163c' is fully closed, so that the chamber pressure in the valve chamber 106' deviates to a minimal extent from the ambient pressure in the bypass channel 104. The valve piston 110' of the second valve device 102 is located in the first position relative to the piston support element 161'.

In the fourth state of the valve arrangement in FIG. 2f, the second connecting channel 163d' of the second valve device 102 demonstrates a flow resistance, which dominates the total resistance for the air flowing between the bypass channel 104 and the valve chamber 106' and which increases as the second connecting channel is increasingly closed. In the fifth state of the valve arrangement in FIG. 2e, the second connecting channel 163d' is then fully closed. Furthermore, in the fourth state of the valve arrangement in FIG. 2d, the first connecting channel 163c' demonstrates a flow resistance, which dominates the total resistance for the air flowing between the pipetting channel 103 and the valve chamber 106' and which reduces as the first connecting channel is increasingly opened.

In the fifth state of the valve arrangement in FIG. 2g, the first connecting channel 163c' of the second valve device 102 is fully opened and the second connecting channel 163d' is fully closed, so that the chamber pressure in the valve chamber 106' is applied maximally to the pipetting channel 103. The valve piston 110' is located in the second position relative to the piston support element 161.

Furthermore, the second connecting channel 163d of the first valve device 101 is completely opened in the first, fourth and fifth state of the valve arrangement in FIGS. 2a, 2f and 2g, and the first connecting channel 163c is fully closed, so that the chamber pressure in the valve chamber 106 deviates from the ambient pressure in the bypass channel 104 to a minimal extent. The valve piston 110 of the first valve device 101 is located in the first position relative to the piston support element 161.

The pipetting pressure in the pipetting channel 103 is set by one valve device, whilst the other valve device substantially fails to influence the pipetting pressure, in particular since the first connecting channel of the other valve device is closed. The second connecting channel or the second opening cross section 167 is in the third position in particular, which is located between the position of the valve piston in the first and/or second position, preferably at least partially opened, and in particular is in a third position, which is closer to the first position than to the second position, preferably opened to an extent at least half the maximum opening or the maximum opening volume. Due to this respective bypass connection between the valve chamber of the valve arrangement 100 and the surrounding environment, pressure fluctuations in the valve chamber, which can be produced by the pump device, in particular are not transferred fully to the pipetting channel and therefore to the liquid column, but are released proportionately to the surrounding environment via the bypass and therefore in particular are damped efficiently with small excursions of the valve pistons from the first position and in particular at low pump outputs and/or pump frequencies. At full pump output, even pipetting containers having a low metering volume can be filled in a very accurate manner. A pipetting process that is more accurate and more comfortable is thus possible.

The active valve device 101, 102 is designed such that, to generate the desired pipetting pressure in the pipetting channel 103, the chamber pressure is distributed in a metered manner between the pipetting channel and the bypass line. To this end, the first connecting channel 163c, 163c' in each case in particular has a variable first flow resistance, and in particular the second connecting channel 163d, 163d' in each case has a variable second flow resistance, wherein, to generate the desired pipetting pressure in the pipetting channel 103, the first flow resistance and the second flow resistance are each adapted by the respective valve device 101, 101'. The first connecting channel and the second connecting channel are in particular connected parallel to one another to the valve chamber and in particular are connected to the bypass channel.

The valve piston 110, 110' is designed such that it closes the first connecting channel 163c, 163c' further in a third position than in a fourth position, and in particular simultaneously closes the second connecting channel 163d, 163d' further in the fourth position than in the third position when the valve piston is arranged in a third position or fourth position, which in particular is located between the first position and second position. The first and/or second flow resistance is thus variable. The third position is preferably located closer to the first position, and the second position is preferably located closer to the fourth position. This can be achieved in particular if a valve device has a throttle function, in particular a double throttle function, wherein the two throttle functions are coordinated with one another in terms of function. The throttle function is achieved in the exemplary embodiment since the first flow resistance of the first connecting channel and the second flow resistance of the second connecting channel are each variable.

In this case, the first flow resistance is variable since a first sub-portion 164 of the piston support element 161, which is substantially hollow-cylindrical in this case, has a first minimal inner diameter D1, and the valve piston 110 extending along the axis A comprises a first sub-portion 111, that is to say the first throttle portion 111, with an outer diameter d1, which is variable along the axis A and which in particular increases towards the end of the valve piston in accordance with a pitch behaviour $\delta d1/\delta A$, that is to say the pitch of the mathematical function d1 (A). The variability of the first flow resistance and in particular the pipetting behaviour can be influenced as desired by means of the shaping of the outer contour of the sub-portion 111, in particular by the constructional adaptation of d1 (A). For this purpose, a first sub-region 111a of the first throttle portion 111, which is closer to the first end 121 of the valve piston 110 than the sub-region 111b of the throttle portion following along the axis A, preferably has a greater pitch than the sub-region 111a.

The second flow resistance is also variable in this case since a second sub-portion 170 of the piston support element 161, which is substantially hollow-cylindrical in this case, has a second minimal inner diameter D2—wherein in this case preferably D2>D1—and the valve piston 110 extending along the axis A comprises a second sub-portion 112, that is to say the second throttle portion 112, having an outer diameter d2, which is variable along the axis A and which in particular increases towards the second end 122 of the valve piston in accordance with a pitch behaviour $\delta d2/\delta A$, that is to say the pitch of the mathematical function d2 (A), and, conversely, decreases towards the first end 121. The variability of the second flow resistance and in particular the pipetting behaviour can be influenced as desired by means of the shaping of the outer contour of the sub-portion 112, in particular by the constructional adaptation of d2 (A). For this purpose, a first sub-region 112a of the first throttle portion 112, which is closer to the second end 122 of the valve piston 110 than the sub-region 112b of the throttle portion 112 following along the axis A, preferably has a mathematically greater pitch $\delta d2/\delta A$, namely a lower gradient, than the sub-region 112a.

In particular, the desired pipetting behaviour of the pipetting apparatus can be achieved by coordinating the first throttle region and the second throttle region, in particular by matching the outer contour thereof, in particular by matching the pitch behaviour pitch $\delta d/\delta A$ of the outer diameter of the throttle region, and/or by matching the inner diameter D1 of the first sub-portion 164 and/or the inner diameter D2 of the second sub-portion 170 of the piston support element 161, which is substantially hollow-cylindrical in this case, in particular by matching the pitch behaviour $\delta D/\delta A$ of the respective inner diameter.

The valve piston preferably generally comprises at least one first substantially conical sub-portion (111), with which the first flow resistance can be varied, in particular by changing the free first opening cross section (168) of the first connecting channel (163c). The valve piston preferably generally comprises at least one second substantially conical sub-portion (112), with which the second flow resistance can be varied, in particular by changing the free first opening cross section (167) of the second connecting channel (163d). The first connecting channel and the second connecting channel are in particular connected parallel to one another to the valve chamber and in particular are connected to the bypass channel. The drop in chamber pressure over the first and second connecting channels can either be estimated mathematically in each case and/or can be determined experimentally.

The second end of a valve piston is closer to the actuation element of the pipetting apparatus than the first end of the valve piston.

The valve piston 110 further comprises a conical stop region 113 for closing the second connecting channel 163d, that is to say a closing portion 114, which has an outer diameter d3, which corresponds substantially to the maximum inner diameter D3 of the sub-portion 166 of the piston support element 161, so that substantially d3=D3, wherein preferably D3>D2. The valve piston 110 further comprises the annular recess 115a for retaining the ring seal 135, which is arranged close to the first end 121 of the valve piston. The valve piston 110 further comprises the annular recess 115b for retaining the ring seal 134, which is arranged close to the closing portion 114 of the valve piston. The valve piston 110 further comprises the extension portion 116, via which the throttle portions are moved by a user from outside the pipetting apparatus by actuating an actuation element to change the first and second flow resistance. The valve piston 110 is spring-mounted on the main body 2 via the recess 117, which is used as an abutment for the spring mounting of the valve piston 110. A flange portion of the actuation element is preferably mounted in the housing 2 between the spring and the main body 2. The actuation element is preferably guided in a guide portion of the main body 2 to carry out the translation along the axis A.

The pipetting behaviour is further adjusted in the case of the pipetting apparatus 1 since the pump output is continuously variable. To this end, the main body 2 comprises at least one Hall sensor as a position sensor (not shown), by means of which the position of the valve piston relative to the main body or relative to the piston support element 161 is detected. The electric control device 8 is designed to change the pump output according to the measured position and/or measured speed of the valve piston 110 along the axis A, in particular to increase the pump output when the valve piston is pressed further inside the piston support element 161 by a user pressing the actuation element in progressively. The use of the pipetting apparatus is thus more efficient, in particular more comfortable, and the adjustment of the pump output is more flexible. In particular, the pump can be switched on immediately by means of the position sensor or another switch, for example a mechanical switch. The mechanical switch can be triggered automatically, for example by a tab on the actuation element, when the actuation button is pressed out of the starting position by the user, preferably when the valve piston is moved out of the first position by the user. This is true at least for the actuation element for aspirating the sample. In the case of the actuation element for dispensing the sample, the pump is preferably only active when a specific third position of the valve piston 110', that is to say an insertion depth, has been reached, since the sample is dispensed under the effect of gravity before the third position is reached and no overpressure is required. The dispensing of the sample controlled by opening the second connecting channel is efficient and comfortable, and the pump activity can additionally accelerate the dispensing process to a desired extent.

A further specific advantage of the pipetting apparatus according to the invention in accordance with the first preferred embodiment with the valve arrangement 100 is as follows: The pipetting apparatus is designed such that substantially only the air volume that corresponds to the air volume that is required to set the desired pipetting pressure in the pipetting channel is exchanged with the surrounding environment through the bypass line 104, wherein air is preferably exchanged substantially only when setting the pipetting pressure and preferably substantially no air is exchanged when the desired pipetting pressure is reached. This exchanged air volume in particular constitutes a net flow between the flow regions of the valve arrangement 100 and the surrounding environment, that is to say either the net volume acquisition of air from the surrounding environment or the net volume delivery of air to the surrounding environment. Less, potentially harmful, for example moist, outside air thus reaches the channel regions of the valve arrangement 100, and, conversely, less air from the valve arrangement 100 is delivered to the surrounding environment, which is more comfortable for the user.

This is achieved in the exemplary embodiment in particular since the pipetting apparatus comprises exactly one pump device, for example with exactly one diaphragm pump, and at least one first (or exactly one first) pump channel 105a for the aspirated air, which is connected on the intake side to the pump device, and a second (or exactly one second) pump channel 105b for the dispensed air, which is connected on the delivery side to the pump device, wherein the first pump channel is connected to the first valve chamber 106 of the first valve device 101, and the second pump channel is connected to the second valve chamber 106' of the second valve device 102, so that both the suction pressure in the first valve chamber 106 and the delivery pressure in the second valve chamber 106' can be produced by means of the one pump device.

FIG. 3a shows a cross-sectional view through a valve arrangement 200 of another pipetting apparatus according to the invention, in accordance with a second preferred embodiment of the invention, in a first state. The components of the valve arrangement 200 are similar to those of the valve arrangement 100 and are denoted by double inverted commas for differentiation. The pipetting apparatus in particular comprises a pump device having a reversible pumping direction. The pump device can thus operate in particular with a single valve support device 101". The pump device could also use two pumps however, each having a constant pumping direction, or could comprise another suitable pump device.

In contrast to the valve arrangement 100, in the case of the valve arrangement 200 the pump channel (not shown), which is not connected directly to the valve chamber 106", is preferably always connected directly to the surrounding environment, in particular to the bypass channel 104", in particular to the sub-portion 104c" of the interior region 163" of the piston support element 161" or the cavity 104a". In this case, the bypass channel 104" is also connected directly to the surrounding environment, that is to say without a considerable drop in pressure, that is to say in particular compared to the drop in pressure according to the first or second flow resistance. In this first state of the valve arrangement 200, the first connecting channel 163c" is closed and the second connecting channel 163d" is opened to a maximum extent. The valve piston 110" is located in the first position.

FIG. 3b shows the valve arrangement of FIG. 3a in a second state. Depending on the pumping direction, the pipetting output is adjusted in this case by partially opening each of the first connecting channel 163c" and the second connecting channel 163d". The valve piston is located in a position between the first and second positions.

FIG. 3c shows the valve arrangement in FIG. 3a in a third state. The pipetting output is maximized by aspirating air into the pipetting channel 103" or expelling it therefrom, depending on the pumping direction, at maximum output. The valve piston 110" is located in the second position.

In the case of the second preferred embodiment of the invention too, the bypass connection 104" between the valve chamber and the surrounding environment is achieved in particular since pressure fluctuations in the valve chamber, which may be caused by the pump device, are not transferred fully to the pipetting channel and therefore to the liquid column, but are delivered proportionately to the surrounding environment via the bypass and therefore are efficiently damped, in particular with small excursions of the valve piston from the first position and in particular at low pump outputs and/or pump frequencies. At full pump output, even pipetting containers having a small metering volume can be filled in a very accurate manner. A pipetting process that is more accurate and more comfortable is thus possible in this case too.

The invention claimed is:

1. Pipetting apparatus (1), in particular for pipetting a fluid sample (9a) by aspiration into a pipetting container (9) by means of air (9b) under a pipetting pressure, said pipetting apparatus comprising the following
 a valve arrangement (10; 100; 200) having at least one valve device (101; 102; 101") for setting a pipetting pressure, wherein the valve device comprises a valve chamber (106; 106'; 106");
 at least one pump device (7), which is connected to the valve chamber to generate a chamber pressure in the valve chamber;
 a pipetting channel (103; 103"), to which the pipetting container can be connected, and
 a bypass channel (104; 104"), which is open to the surrounding environment;
 wherein the pipetting channel and the bypass channel are each connected to the valve chamber;

wherein the at least one valve device is designed such that, to generate the desired pipetting pressure in the pipetting channel, the chamber pressure is distributed by the valve device between the pipetting channel and the bypass channel, wherein the pipetting channel (103; 103") is connected to the valve chamber (106; 106'; 106") via a first connecting channel (163c; 163c'; 163c") having variable first flow resistance, and the bypass channel (104; 104") is connected to the valve chamber (106; 106'; 106") via a second connecting channel (163d; 163d'; 163d") having variable second flow resistance, wherein, to generate the desired pipetting pressure in the pipetting channel, the first flow resistance and the second flow resistance are adapted by the valve device, wherein the valve device comprises a closure support element (161; 161'; 161") and at least one closure element (110; 110'; 110"), which is arranged so as to be movable in translation relative to the closure support element at least between a first position and a second position, wherein the closure element closes the first connecting channel in the first position and does not close the first connecting channel in the second position, and wherein the closure element does not close the second connecting channel in the first position and closes the second connecting channel in the second position, and wherein the closure element is formed such that it partially opens the first connecting channel and the second connecting channel when it is arranged in a third position between the first and second position.

2. Pipetting apparatus according to claim 1, wherein the closure element is formed such that it closes the first connecting channel further in a third position than in a fourth position, and closes the second connecting channel further in the fourth position than in the third position when the closure element is arranged in a third position or fourth position, which is located between the first position and second position.

3. Pipetting apparatus according to claim 1, which is manually operable, wherein the valve device is designed for the position of the closure element to be determined by the user in order to set the desired pipetting pressure in the pipetting channel.

4. Pipetting apparatus according to claim 1, wherein the closure element is a valve piston (110; 110'; 110"), which extends along an axis A through the valve device and is movable in translation along the axis A relative to the closure support element, at least between said first position and said second position.

5. Pipetting apparatus according to claim 4, wherein the first connecting channel has a first opening cross section, and the valve piston has a first piston portion, which is arranged movably in the first opening cross section so as to close said first opening cross section, at least in part or completely, between the first and second position, and wherein the second connecting channel has a second opening cross section, and the valve piston has a second piston portion, which is arranged movably in the second opening cross section so as to close said second opening cross section, at least in part or completely, between the second and first position.

6. Pipetting apparatus according to claim 5, wherein the first piston portion and/or the second piston portion has a conical portion, of which the cross section perpendicular to the axis A changes, at least over portions, continuously along the axis A.

7. Pipetting apparatus according to claim 1, which is designed as a manually operable electric pipetting apparatus, which comprises a pistol-like grip, which comprises at least one actuation element, which can be engaged by the user, the chamber pressure being controlled by the user and distributed, metered by the at least one valve device, between the pipetting channel and the bypass channel upon actuation of said actuation element to generate the desired pipetting pressure in the pipetting channel.

8. Pipetting apparatus according to claim 1, which comprises a first valve device having a first valve chamber and a second valve device having a second valve chamber, wherein the pump device is connected to the first valve chamber to generate a first chamber pressure therein and is connected to the second valve chamber to generate a second chamber pressure therein, wherein the first valve chamber and the second valve chamber are each connected to the pipetting channel and to the bypass channel, wherein the first valve device is designed such that a pressure is set in the pipetting channel and is suitable for aspirating a fluid sample into a pipetting container connected in an airtight manner to the pipetting channel, and wherein the second valve device is designed such that a pressure is set in the pipetting channel and is suitable for dispensing a fluid sample from a pipetting container connected in an airtight manner to the pipetting channel.

9. Pipetting apparatus according to claim 8, which is manually operable and is designed such that, to aspirate the fluid sample, the connecting channel between the first valve chamber and the pipetting channel is at least partially opened and the connecting channel between the second valve chamber and the pipetting channel is closed, and such that, to dispense the fluid sample, the connecting channel between the first valve chamber and the pipetting channel is closed and the connecting channel between the second valve chamber and the pipetting channel is at least partially opened.

10. Pipetting apparatus according to claim 8, which has a connecting channel between the first valve chamber and the bypass channel and which has a connecting channel between the second valve chamber and the bypass channel wherein the pipetting apparatus is manually operable and is designed such that, to aspirate the fluid sample, the connecting channel between the first valve chamber and the bypass channel is at least partially opened or is closed, and the connecting channel between the second valve chamber and the bypass channel is open, and such that to dispense the fluid sample, the connecting channel between the first valve chamber and the bypass channel is open and the connecting channel between the second valve chamber and the bypass channel is at least partially or completely opened.

11. Pipetting apparatus according to claim 8, which is designed such that only the air volume corresponding to the air volume that is required to set the desired pipetting pressure in the pipetting channel is exchanged with the surrounding environment through the bypass channel, wherein air is exchanged substantially only when setting the pipetting pressure and substantially no air is exchanged when the desired pipetting pressure has been reached.

12. Method for producing the pipetting apparatus (1) according to claim 1, said method at least comprising the following steps:

manufacturing the at least one valve device at least partially from a first material;

manufacturing the at least one pipetting channel and the at least one bypass channel at least partially from a second material.

* * * * *